United States Patent [19]
Wright

[11] 3,971,597
[45] July 27, 1976

[54] ALL TERRAIN VEHICLE
[76] Inventor: Harold R. Wright, 18950 Woodward Ave., Detroit, Mich. 48203
[22] Filed: Mar. 26, 1975
[21] Appl. No.: 562,355

[52] U.S. Cl. .............................. 305/10; 280/28.5; 115/1 R
[51] Int. Cl.² ........................................ B62D 35/30
[58] Field of Search ............... 115/1 R; 305/10, 20, 305/47, 48, 49; 180/5 R; 280/28.5, 43.23

[56] References Cited
UNITED STATES PATENTS

| | | | |
|---|---|---|---|
| 1,367,992 | 2/1921 | Schneider | 305/10 |
| 3,020,059 | 2/1962 | Allen | 280/28.5 X |
| 3,539,229 | 11/1970 | Scully | 305/10 |

Primary Examiner—Philip Goodman
Attorney, Agent, or Firm—Allan J. Murray

[57] ABSTRACT

A hollow body including spaced apart side walls, with a plurality of longitudinally spaced, laterally extending wall-support members surmounting a plurality of laterally spaced longitudinally extending floor reinforcement members. A track structure including a plurality of laterally disposed track structure support members projecting exteriorly of said walls in longitudinal alignment with, and secured to, said wall-support members. Said track structure further including an upper fixed runway and, substantially parallel thereto, a lower fixed runway, both elongated longitudinally of the vehicle. A supplementary runway surmounting said upper, fixed runway. Means to secure said supplementary runway above said upper, fixed runway. Means urging said supplementary runway toward said upper, fixed runway, and means adjustably resisting said urge, to space said supplementary runway from said upper, fixed runway. An endless chain drive, and means to drive said chain. Wheels carried by said endless chain about said track structure, and comprising a lower span upon which the track structure and hence the vehicle rests, and an upper span which moves over said supplementary runway. The adjustability of the supplementary runway may compensate for slack in said chain.

23 Claims, 8 Drawing Figures

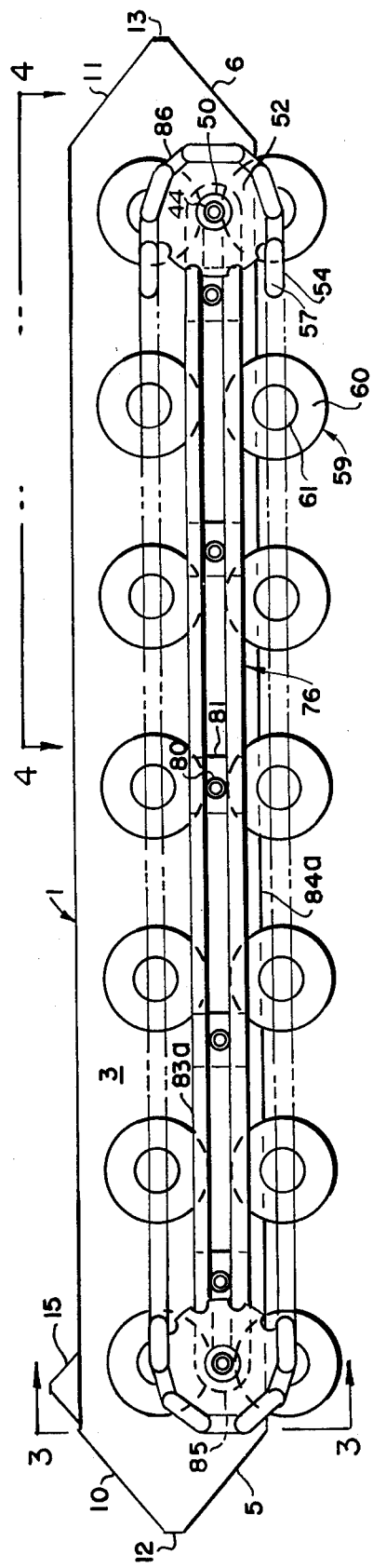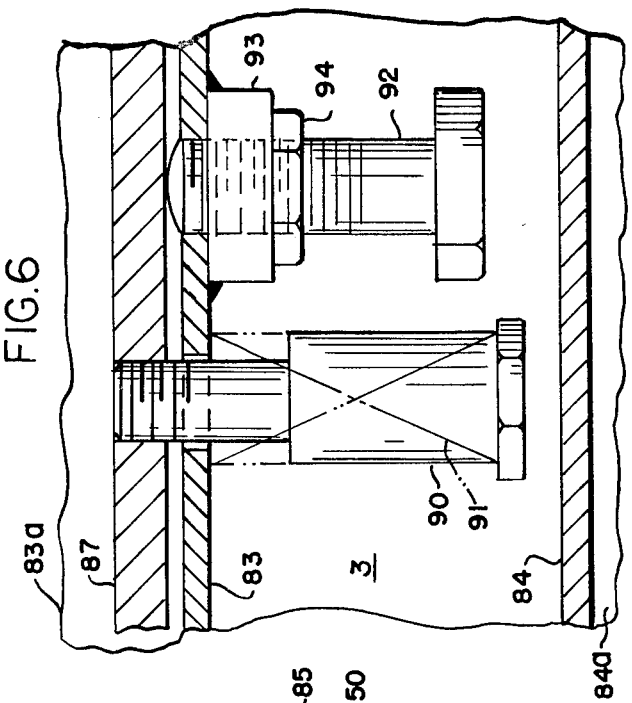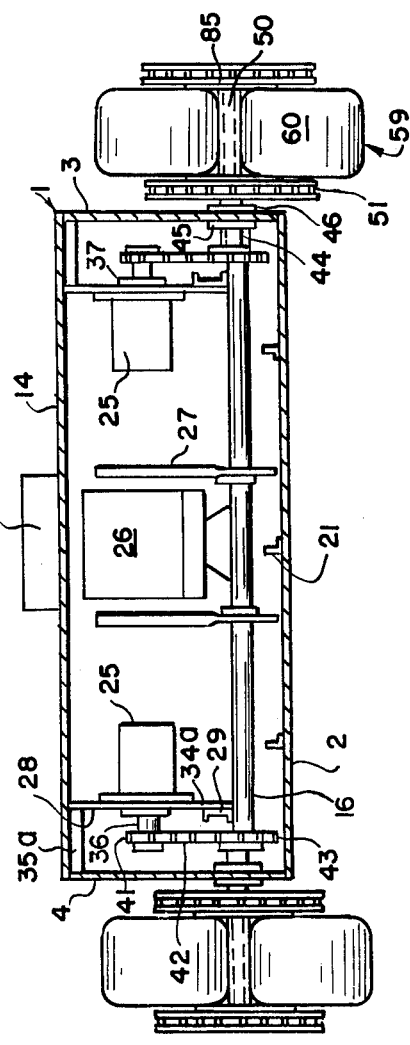

ALL TERRAIN VEHICLE

FIELD OF INVENTION

The invention lies in the field of amphibious, all-terrain vehicles, and particularly such vehicles as are supported on land by a plurality of wheels, which wheels are so motivated as to propel the vehicle either on land or while floating on water. said wheels are revolubly mounted, and are all propelled by said endless chain, or the like, which is itself driven by a power source carried by the vehicle. The wheels carry pneumatic tires and are so designed as to resist access of moisture, dirt, and the like to the valves. The wheel axle assemblies are designed to allow the wheels to be positioned along the chain wherever two links of chain are pivotally connected.

DESCRIPTION OF THE PRIOR ART

The prior art discloses vehicles of this nature, with pluralities of wheels driven by cables and belts, but none of which appear to show any means of adjustably spacing a supplementary runway on the track structure to take up undesired slack in a driving element, such as a chain drive. Nor, does any of the prior art, so far as is known to applicant, provide specially designed wheels to resist admission of dirt or moisture to a valve (for inflating or deflating the tire), which provision is of importance in a vehicle intended to encounter a variety of dusty, muddy, and wet surfaces. Further, no prior art appears to utilize the conception of structurally reinforcing the body of a vehicle in such a manner that a track structure support may be laterally projected exteriorly of said body and secured to an inner support of said body to avert weakening of a side wall of said body.

SUMMARY OF THE INVENTION

Invention lies in the provision in a vehicle supported and propelled by a plurality of wheels, disposed to be driven by an endless chain, and constituting an upper and lower moving span of wheels, of an adjustable supplementary runway disposed in substantial parallelism to a fixed runway of said track structure, for adjustment toward and away from said track structure to increase or decrease as desired, the amount of slack in the driving chain.

Invention is further thought to lie in the provision of a novel and specifically designed wheel for such vehicle to protect the air inlet-outlet valve of a pneumatic tire from dust, dirt and moisture.

Invention is thought to reside still further in a novel structural provision of laterally extending support members conjoining and supporting two opposite walls of a body, and secured within said vehicle in such a manner as to afford attachment to said supporting members of outboard projections or extensions to mount said track structure, thus providing for a rigid body construction which is not weakened by addition of the track structure support members.

This invention is attained by the disclosure set forth in the following specification, and illustrated in the accompanying drawings, wherein:

FIG. 2 is a side elevational view taken on line 2—2 of FIG. 1.

FIG. 3 is a vertical, sectional view taken on line 3—3 of FIG. 2.

FIG. 6 is a view taken on line 6—6 of FIG. 4, showing on a substantially larger scale, the device for retaining and adjusting the supplementary runway.

Figure 1:
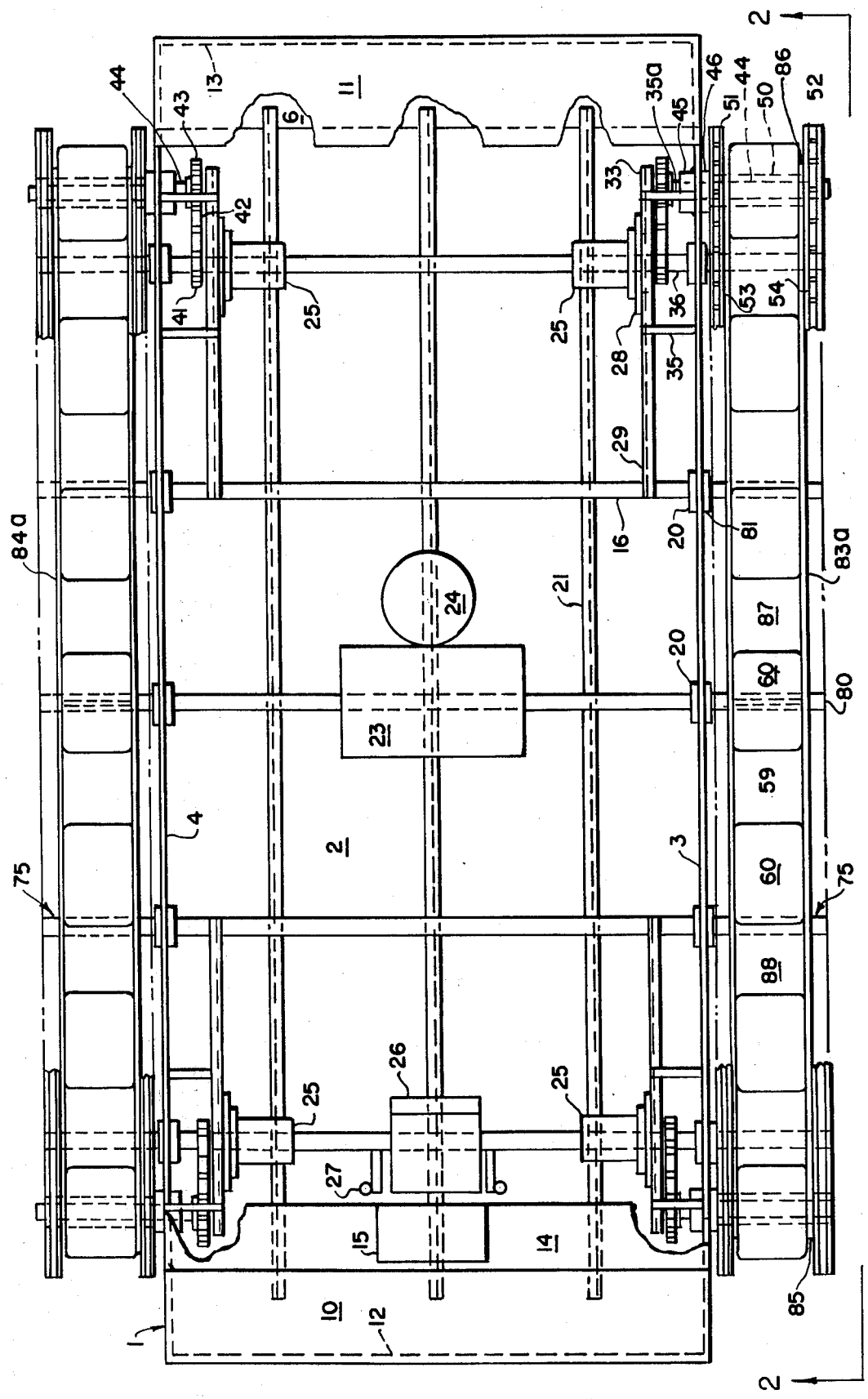
FIG. 1 is a plan view, looking down upon the device, with some of the deck members, broken away for the sake of clarity.

In these views, the reference character 1 indicates generally the body of said vehicle, said body having a bottom wall 2, and spaced apart, opposite sidewalls 3 and 4.

The bottom wall 2 of the vehicle forwardly terminates in an upwardly sloping wall 5, and rearwardly in a similarly upwardly sloping wall 6. The forward end portion of the vehicle has a downwardly sloping wall 10, convergent with the said wall 5, and the rear portion of the vehicle has a similarly, downwardly sloping wall 11 convergent with the aforesaid wall 6. The converging front walls, 5 and 10, are conjoined by a flat vertical strip 12, and the convergent rear walls 6 and 11 are conjoined by a flat strip 13.

It may be desired to surmount the front portion of the vehicle with a deck 14, and, for illustrative purposes, there is disclosed a hood 15 in which dials such as speedometer, oil pressure, temperature gauges, etc., may be located.

As may best be seen in FIG. 1, the side walls are rigidly conjoined by tubular braces, or cross members 16. The respective ends of said braces are secured, as by welding, to rectangular blocks 20, which in turn are welded to the respective side walls 3 and 4 of the vehicle.

Longitudinal channel members 21 are rigidly secured as by welding to the bottom wall 2 of the vehicle, and extend as shown particularly in FIG. 1, the full length of said bottom wall. The end portions of said longitudinally disposed channel members may have their lower surfaces altered to conform to the upward slopes of the respective front and rear walls 5 and 6. Preferably disposed for balance of the vehicle, in the central area thereof, is an engine 23 and a pump 24.

From the pump, suitable conduits (not shown) lead to each of four fluid motors 25 to transmit driving power from the engine 23, and it is proposed to equip the vehicle with appropriate controls (not shown) to govern the flow of fluid from said pump 24 to the left and right hand pairs of said fluid motors 25 to govern direction and speed of the vehicle. Obviously, if the right hand chain of wheels is immobilized, while the left hand chain of wheels is driven, it would result in a turning motion of the vehicle, depending upon which direction the left hand chain of wheels is moving.

Further, for illustrative purposes, there is disclosed as may be seen in FIG. 1, a seat 26 for the driver of the vehicle, with a pair of manually operable control levers 27 which are shown merely to illustrate a form of controls.

Figure 4:
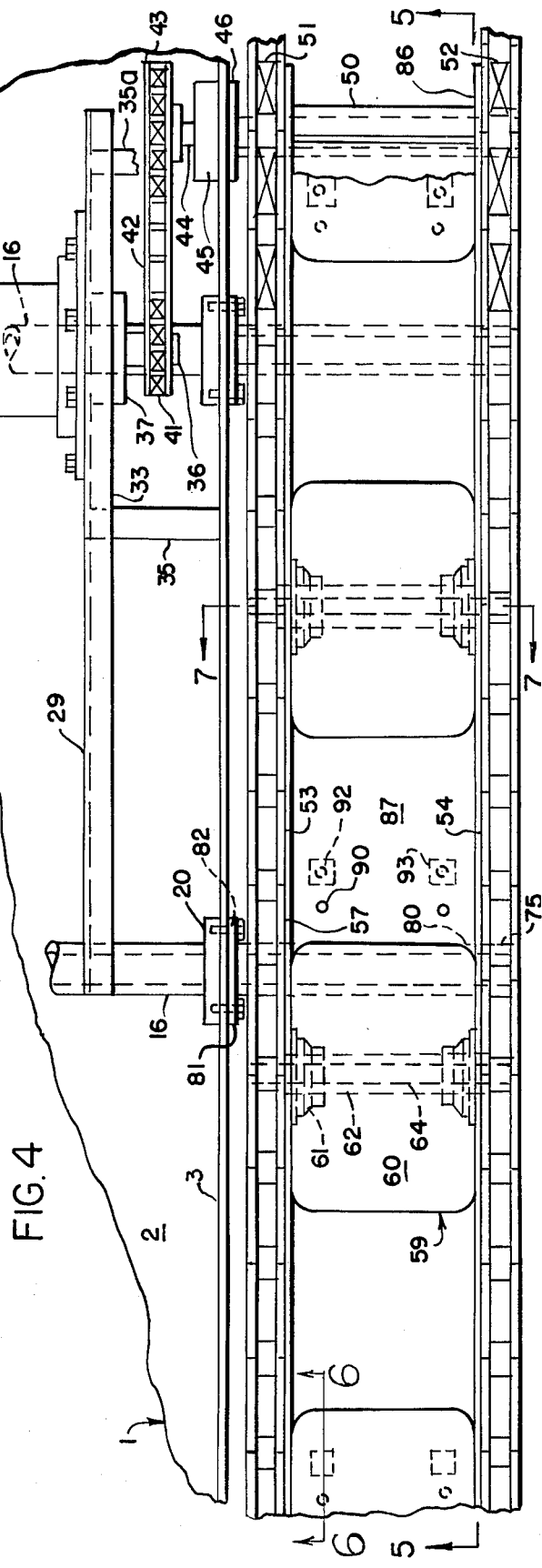
FIG. 4 is a partial horizontal top view of the machine taken on line 4—4 of FIG. 2, and showing (in a larger scale) a fluid motor and chain drive as it would appear in the lower right hand portion of FIG. 1.

With further reference to the fluid motors 25, provision is made to mount each motor upon a respective, vertically disposed plate 28. The lower end portion of each said plate is secured, as by bolts, screws, or the like (not shown), to the channel member 29 extending longitudinally of the vehicle, and rigidly surmounting two of the cross members 16. Spaced upwardly from and disposed parallel to said channel member 29 is a support member 33, which may be of angle iron, or the like. Conjoining and rigidly spacing the channel member 29 with said upper support member 33 are vertical struts 34, 34a. Further contributing to the rigidity and stability of the fluid motor mounting structure are horizontal braces 35 and 35a, which extend from said upper support member 33 to the adjacent sidewall of the vehicle. In FIG. 4, the horizontal brace 35a is partially broken away to more clearly illustrate the elements thereunder.

The fluid motors 25 are each equipped with a drive shaft 36, which projects through its respective mounting plate 28 and through a bearing block 37, which may be secured to said mounting plate in any desired manner, to mount a sprocket 41. A chain 42 is carried, and driven by said sprocket 41, to drive a sprocket 43 mounted upon and driving a driven shaft 44. A pair of bearing blocks 45 and 46 are disposed respectively on the inner and outer surfaces of a sidewall, to journal the shaft 44. Enclosing a substantial portion of each said shaft 44 is a tubular spacer member 50. A pair of sprockets 51 and 52, is mounted upon and driven by each shaft 44, as by splined interconnection (not shown), the spacing of said inner and outer sprockets being maintained by the aforesaid spacer 50. Any convenient means, such as a cotter pin, or the like, may be used to resist escape of each outer sprocket 52 from its shaft 44.

As is clear from FIGS. 1 and 2, there is a rearwardly disposed pair and a forwardly disposed pair of said externally mounted sprockets 51, 52 on each side of the vehicle, and said sprockets carry and drive an inner chain 53 and an outer chain 54. Said chains are constructed in the manner of bicycle or motorcycle drive chains, and are provided with sleeves 55 which space the side members 57 of the chain, and with stub shafts 56 which are appropriately and conventionally formed to resist escape of said side members, while affording rotation of said side members about the pivotal axis of the stub shaft 56.

The vehicle is provided with wheels 51, having pneumatic tires 60. As may best be seen in FIGS. 7 and 8, said wheels are provided with spaced apart, dished hubs 61, secured concentrically, as by welding, upon a tubular wheel axle 62. The end portion of the tubular axle may be recessed to receive bearings 63. Each wheel is provided with an axle shaft 64 which extends through said bearings, and has end portions 65 dimensioned in such a manner as to replace the aforesaid stub shafts 56. This arrangement affords the disposition of a wheel at any point in which there is a juncture between two links of the chain, and further affords disposition of such wheels in either regular or irregular sequence, should the latter for any reason be desirable. A cotter pin hole 66 is shown in the ends of the shaft, and may receive a cotter pin, or the like, to resist withdrawal of the chain from the side member 57 from the outer portion 65 of the shaft 64.

Figure 8:
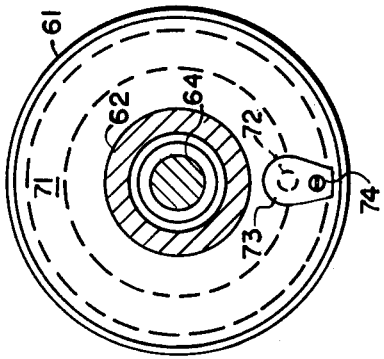
FIG. 8 is a vertical, partial view in partial section taken on line 8—8 of FIG. 7.
Figure 7:
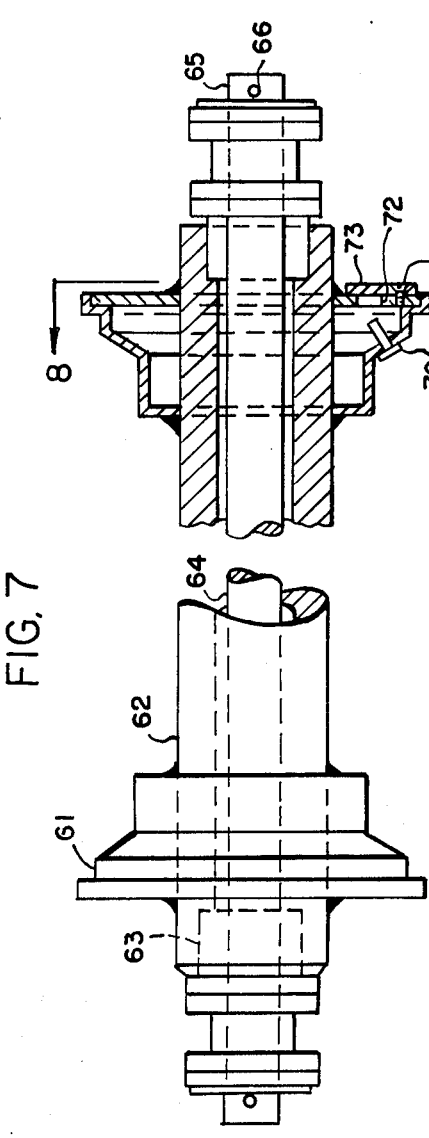
FIG. 7 is a vertical, partial view in partial section taken on line 7—7 of FIG. 4, omitting a tire and showing only the axle, chain links, and hub members of the wheels to illustrate the construction of said members.

As is best seen in FIGS. 7 and 8, at least one of the dished hub members is equipped with a valve 70, whereby a pneumatic tire (not shown in FIGS. 7 and 8) may be inflated or deflated. As the vehicle travels in water, snow, mud, dust, and on ice, it is desirable that the valve be protected from these elements, and for this reason, and also to strengthen the outer peripheral portion of the hubs 61, each hub receives a closure disc 71 which may be welded peripherally at the hub, as well as being welded to the tubular axle 62. To afford access to the valve, said closure disc is apertured at 72, and said aperture is covered with a dust cover 73, secured as by a screw 74 to cover said closure disc 71.

A track structure 75, 76 for the aforesaid wheels 59, includes outboard tubular supports 80 projecting laterally from the respective sidewalls 3 and 4. An end of each said tubular support is welded or otherwise secured to a block 81, which block is aligned on the outer surface of a respective side wall with a rectangular block 20, which is welded to the inner surface of the respective side wall. It is proposed to secure the outboard blocks 81 to the interior blocks 20, as by screws 82, threadedly received in dead-end holes formed in said blocks 20. Thus, with a weld extending peripherally, completely around the interiorly mounted blocks 20, and with said screw holes being dead-ended, there is no possibility of water seepage into the body through said screw holes.

Each respective outboard tubular support member 80 is preferably formed with upper and lower flats, to facilitate the mounting on said flats of an upper fixed runway member 83 and a lower fixed runway member 84. Said runways are in the form of channels, having side walls 83a, 84a, and may be secured to the tubular outboard supports 80 as by screws, welding, or any other suitable manner (not shown). It should be noted, that the ends of each upper and lower runway, 83, 84, are secured to the tubular spacer member 50 for rigidity. Semi-circular end pieces 85, 86 are secured to each end of each fixed runway as a continuation of the side walls 83a, 84a.

However, in order to obtain adjustment of slack in the chain without the necessity of providing an adjustable axle for the various sprockets 51, 52, a supplemental runway 87, 88, is disposed above the upper, fixed runway 83 in a substantially parallel relationship to said upper track member. A plurality of retaining shoulder screws 90, extend through said upper, fixed track member and each has an end portion threadedly received in said supplemental runway to retain said supplemental runway in position. Each retaining screw 90 carries a spring 91 which reacts between said upper, fixed runway and the head of said screw 90 to urge the supplemental runway toward the track structure.

Figure 5:
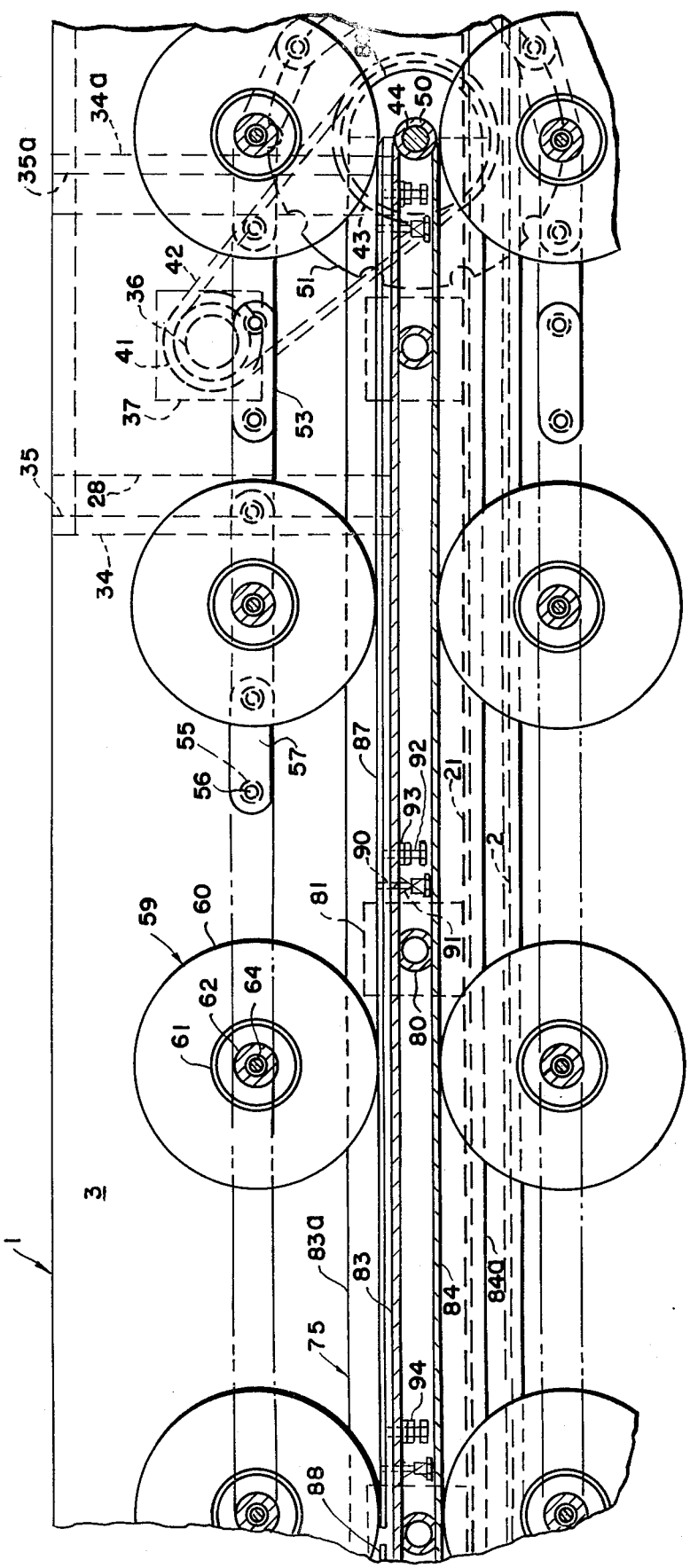
FIG. 5 is a partial, vertical, sectional, elevational view taken on line 5—5 of FIG. 4.

To counter the action of the spring 91, there is provided an adjusting screw 92, which has threaded engagement in a block 93 and through the upper, fixed runway 84, so that its end portion may bear against the under surface of the supplemental runway 87, 88. The block 93 is welded to the under surface of said upper, fixed runway 83, and a jam nut 94 may secure said adjusting screw 92 against undesired rotation once the supplemental runway 87, 88 has been positioned. The supplemental runway could extend as a single element the full extent of the track. However, it may be desired to divide such suplemental runway into the two sections, 88, 88, as may best be seen in FIG. 5.

It is conceivable that a supplemental runway could be disposed beneath the lower, fixed runway, either to supplement or substitute for the supplemental runway as hereinbefore described.

It will be apparent that all of the wheels will move in an elongated orbit, extending longitudinally of the vehicle, and that as all of the wheels are carried by the chain, in the travel of the chain, and as the drive is not to the axles of the wheels, there is no possibility that individual wheels will spin and dig in.

What I claim is:

1. A vehicle to traverse a surface, said vehicle comprising a hollow body having opposite sidewalls, and have a front end and a rear end,
   a track structure extending rigidly, longitudinally of said body,
   a plurality of wheels sequentially disposed to travel longitudinally about said track structure in an endless path,
   said wheels including an upper span traveling above said track structure, and a lower span traveling beneath said track structure, to engage a surface being traversed,
   said track structure having a lower, fixed runway resting upon said lower span of wheels, whereby said vehicle is supported upon and carried by said lower span,
   said track structure having an upper, fixed runway to support said upper span of wheels,
   endless driven means carried by said body to interengage and drive said wheels in said endless path,
   drive means carried by said body to engage and drive said driven means,
   a power source carried by said body, and means to transmit driving power from said power source to said drive means, wherein the improvement comprises,
   a supplemental runway elongated longitudinally in a position of said track structure and having a surface engaged with a span of wheels,
   retaining means to retain said supplemental runway in said position, and
   adjusting means to afford positive adjustment of said supplemental runway toward and away from said track structure to compensate for slack in said endless drive means.

2. In a vehicle as set forth in claim 1, said track structure comprising two track structures disposed to protrude oppositely, laterally of said vehicle, and
   means to rigidly secure each respective track structure to a respective sidewall of said vehicle, wherein said improvement is further comprised in,
   said retaining means being one or more screws interengaging said track structure and said supplemental runway,
   means normally urging said supplemental runway towards said track structure, and
   adjusting means counteracting said last mentioned means to establish said supplemental runway in a desired, spaced relationship to said track structure.

3. In a vehicle as set forth in claim 2,
   said adjusting means including a screw, threadedly carried by the track structure,
   a portion of said screw being engageable with said supplemental runway whereby said supplemental runway responds to rotative adjustment of said screw to increase the spacing between said supplemental runway and said track structure.

4. In a vehicle as set forth in claim 1,
   said track structure consisting of two track structures disposed to protrude oppositely, laterally of said vehicle, and
   means to rigidly secure each respective track structure to a respective sidewall of said vehicle, wherein said improvement is further comprised in,
   a supplemental runway being disposed to surmount each track structure,
   said retaining means being a screw interconnecting said track structure and said supplemental runway to retain said tracking plate in a position surmounting said track structure,
   yieldably resistant means reacting between said supplemental runway and said retaining screw to urge said supplemental runway toward said track structure, and said adjusting means being an adjustment screw, having threaded passage through said track structure, whereby,
   a portion of said adjusting screw engages said supplemental runway to drive said supplemental runway upwardly, away from said track structure.

5. In a vehicle as set forth in claim 4,
   said supplemental runway being comprised of at least two elongated plates independently surmounting said track structure, and being independently adjustable thereon.

6. A vehicle as set forth in claim 5, wherein said endless drive means is an endless chain, comprised of a plurality of links,
   a stub shaft member pivotally conjoining each adjacent end of each link of said endless chain,
   said wheels including an axle member, each wheel being revolubly mounted upon said axle member,
   each said axle member having a terminal end portion,
   each said terminal end portion being dimensioned for reception in said links to pivotally conjoin the links adjacent to said end portion,
   whereby said wheels may be disposed along said endless chain at any pivotal junction of any two adjacent links.

7. In a vehicle as set forth in claim 6,
   said wheels including concentric, axially spaced rim members,
   said rim members being axially dished toward each other,
   said rim members being annularly, peripherally formed to receive the respective beads of a pneumatic tire in air-sealed retention thereon, and
   said terminal end portion protruding beyond at least one said rim member to pivotally interconnect adjacent links of said chain.

8. A vehicle as set forth in claim 7, wherein said endless drive member constitutes a pair of spaced apart endless chains,
   said wheels are disposed between said spaced apart chains,
   a terminal end portion protrudes axially beyond each spaced apart rim member, laterally of each wheel, to respectively engage and conjoin the respective links of a respective chain.

9. A vehicle as set forth in claim 8,
   each wheel having an exterior annular face,
   a valve secured in a dished member of each wheel, to extend from said annular face,
   a lid engaged with said exterior annular face to enclose the dished position of each rim member, and enclose said valve, a hole in said lid to afford access to said valve member for inflation and deflation of said pneumatic tire, and a cover movable to cover said hole to resist admission of foreign materials through said hole and to said valve member, and to uncover said hole to afford said access.

10. A vehicle as set forth in claim 1, said body including a bottom wall, with opposite spaced sidewalls, one or more sidewall support members elongated laterally and interiorly of said vehicle, first securing means securing a respective end of said support member to each respective sidewall, one or more track structure support means projecting laterally from and extending exteriorly of each wall, second securing means securing an end of each track structure support means to said wall, and to said first securing means.

11. In a vehicle as set forth in claim 10, a plurality of reinforcing members rigidly extending along said bottom wall, interiorly, and longitudinally of said vehicle, said reinforcing members being disposed to underlie and support said sidewall support members.

12. In a vehicle as set forth in claim 1, said means to transmit driving power being at least one fluid motor, energized by said power source, drive means interconnecting said fluid motor and said endless driven means carried by said body to communicate a drive to said wheels, a mounting beam, extending between and surmounting at least two wall support members, a mounting plate disposed substantially vertical in said vehicle, the lower end of said mounting plate being secured to said mounting beam, said mounting plate having an upper end, struts extending from the said upper end portion to said sidewall to rigidly maintain the substantially vertical position of said mounting plate, said fluid motor being mounted upon said mounting plate.

13. A vehicle as set forth in claim 1, wherein said endless drive means is an endless chain, and includes a plurality of links, a stub shaft member pivotally conjoining each adjacent end of each link of said endless chain, said wheels including an axle member, each wheel being revolubly mounted upon said axle member, each said axle member having a terminal end portion, each said terminal end portion being dimensioned for reception in said links to pivotally conjoin the links adjacent to said end portion, whereby said wheels may be disposed along said endless chain at any pivotal junction of any two adjacent links.

14. In a vehicle as set forth in claim 13, said wheels including concentric, axially spaced rim members, said rim members being axially dished toward each other, said rim members being annularly, peripherally formed to receive the respective beads of a pneumatic tire in air-sealed retention thereon, and said terminal end portion protruding beyond at least one said rim member to pivotally interconnect adjacent links of said chain.

15. A vehicle as set forth in claim 14, wherein said endless drive member constiutes a pair of spaced apart endless chains, said wheels are disposed between said spaced apart chains, a terminal end portion protrudes axially beyond each spaced apart rim member, laterally of each wheel, to respectively engage and cojoin the respective links of a respective chain.

16. A vehicle as set forth in claim 15, each wheel having an exterior annular face, a valve secured in a dished member of each wheel, to extend from said annular face, a lid engaged with said exterior annular face to enclose the dished position of each rim member, and enclose said valve, a hole in said lid to afford access to said valve member for inflation and deflation of said pneumatic tire, and a cover movable to cover said hole to resist admission of a foreign materials through said hole and to said valve member, and to uncover said hole to afford said access.

17. A vehicle to traverse a surface, said vehicle comprising a hollow body having opposite sidewalls, and having a front end and a rear end, a track structure extending rigidly, longitudinally of said body, a plurality of wheels sequentially disposed to travel longitudinally about said track structure in an endless path, said wheels including an upper span traveling above said track structure, and a lower span traveling beneath said track structure, to engage a surface being traversed, said track structure having a lower, fixed runway resting upon said lower span of wheels, whereby said vehicle is supported upon and carried by said lower span, said track structure having an upper, fixed runway to support said upper span of wheels, endless driven means carried by said body to interengage and drive said wheels in said endless path, drive means carried by said body to engage and drive said driven means, a power source carried by said body, and to transmit driving power from said power source to said drive means, said endless drive means being an endless chain, comprised of a plurality of links, wherein the improvement comprises, a stub shaft member pivotally conjoining each adjacent end of each link of said endless chain, said wheels including an axle member, each wheel being revolubly mounted upon said axle member, each said axle member having a terminal end portion, each said terminal end portion being dimensioned for reception in said links to pivotally conjoin the links adjacent to said end portion, whereby said wheels may be disposed along said endless chain at any pivotal junction of any two adjacent links.

18. In a vehicle as set forth in claim 17, said wheels including concentric, axially spaced rim members, said rim members being axially dished toward each other, said rim members being annularly, peripherally formed to receive the respective beads of a pneumatic tire in air-sealed retention thereon, and said terminal end portion protruding beyond at least one said rim member to pivotally interconnect adjacent links of said chain.

19. A vehicle as set forth in claim 18, wherein said endless drive member constitutes a pair of spaced apart endless chains, said wheels are disposed between said spaced apart chains, a terminal end portion protrudes axially beyond each spaced apart rim member, laterally of each wheel, to respectively engage and conjoin the respective links of a respective chain.

20. A vehicle as set forth in claim 19, each wheel having an exterior annular face, a valve secured in a dished member of each wheel, to extend from said annular face, a lid engaged with said exterior annular face to enclose the dished position of each rim member, and enclose said valve, a hole in said lid to afford access to said valve member for inflation and deflation of said pneumtic tire, and a cover movable to cover said hole to resist admission of foreign materials through said hole and to said valve member, and to uncover said hole to afford said access.

21. A vehicle as set forth in claim 17, said body including a bottom wall, with opposite spaced sidewalls, one or more sidewall support members elongated laterally and interiorly of said vehicle, a first securing means securing a respective end of said support member to each respective sidewall, one or more track structure support means projecting laterally from and extending exteriorly of each wall, second securing means securing an end of each track structure support means to said wall, and to said first securing means.

22. In a vehicle as set forth in claim 21, a plurality of reinforcing members rigidly extending along said bottom wall, interiorly, and longitudinally of said vehicle, said reinforcing members being disposed to underlie and support said sidewall support members.

23. In a vehicle as set forth in claim 17, said means to transmit driving power being at least one fluid motor, energized by said power source, drive means interconnecting said fluid motor and said endless driven means to communicate a drive to said wheels, a mounting beam, extending between and surmounting at least two wall support members, a mounting plate disposed substantially vertical in said vehicle, the lower end of said mounting plate being secured to said mounting beam, said mounting plate having an upper end, struts extending from the said upper end portion to said sidewall to rigidly maintain the substantially vertical position of said mounting plate, said fluid motor being mounted upon said mounting plate.

* * * * *